June 7, 1966 MASAKI OKAJIMA 3,254,584
SINGLE-LENS REFLEX CAMERAS WITH LENS SHUTTERS
Filed Dec. 23, 1963     2 Sheets-Sheet 1

United States Patent Office 3,254,584
Patented June 7, 1966

3,254,584
SINGLE-LENS REFLEX CAMERAS WITH LENS SHUTTERS
Masaki Okajima, Tokyo, Japan, assignor to Kabushiki Kaisha Ricoh, Tokyo, Japan, a corporation of Japan
Filed Dec. 23, 1963, Ser. No. 332,531
Claims priority, application Japan, Dec. 21, 1962, 37/78,127
7 Claims. (Cl. 95—42)

This invention relates to single-lens reflex cameras with lens shutters.

As is well-known, in a single-lens reflex camera with lens shutter, there must be provided, behind the shutter, a reflecting mirror and a light-intercepting plate which should be mechanically interconnected with the lens shutter. In practice, however, such interconnections are not easy to carry out, and the present invention contemplates to provide positive and reliable interconnections between lens shutters and reflecting mirrors, light-intercepting plates, and other mechanical parts of single-lens reflex cameras with lens shutters.

Another object of the present invention is to provide a single-lens reflex camera with a lens shutter, in which a set ring rotatable about the light axis of the objective lens has its part pivotally connected with a connecting and disconnecting lever, whereby the swing motion of the reflecting mirror and the light-intercepting plate, and other associated movements are positively effected.

Another object of the present invention is to provide a lens shutter for use in a single-lens reflex camera, in which the shutter blades effect their opening and closing movement by their release after charging in the same manner as in ordinary lens shutters, and in addition, by suitable means of behind the shutter case independently from the releasing elements.

A further object of the present invention is to provide a single-lens reflex camera in which the shutter blades are normally held in open condition, and the object may be observed through the objective lens and shutter case. In other words, when the shutter-release button is depressed in the camera of the present invention, the open shutter blade is first closed, and then the iris blades are moved in, the reflecting mirror and light-intercepting plate is withdrawn simultaneously from the light-path, and then the shutter blades effect the opening and closing movement at a predetermined speed to expose the film to the necessary amount of light, the shutter blade returning to the open position after the reflecting mirror and light-intercepting plate have returned to the original positions.

There are other objects and features of the present invention, which will be made obvious from the following detailed description of a preferred embodiment of the present invention with reference to the accompanying drawings, in which:

FIG. 6 is side elevational view of the reflecting mirror and light-intercepting plate with associated parts.

Figure 1:
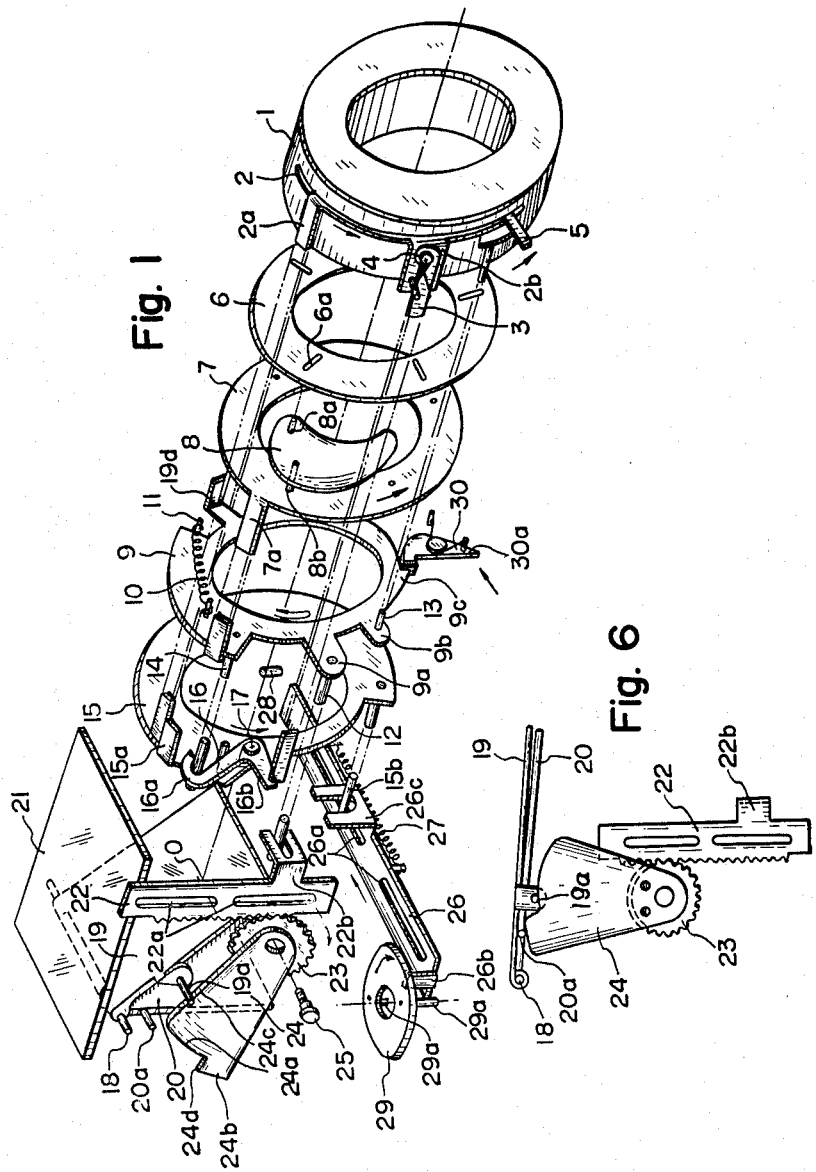
FIG. 1 is an exploded perspective view of the essential parts of a single-lens reflex camera embodying the present invention.

Referring to FIG. 1 of the drawings, the light axis of the objective lens is represented by chain line 0. The camera shown comprises a lens shutter 1, and a charge ring 2 for the shutter, which ring is rotatable about the light axis, and is provided with two tabs 2a and 2b extending parallel to the light axis. One tab 2a has an end engaging a set ring as will be hereinafter described, while the other tab 2b has an outer face provided with a rivet 4 through which one end of a swing link 3 is pivotally connected to the tab 2a, the swing link 3 having a tendency to rotate in the clockwise direction in FIG. 1. The shutter is provided with a release lever 5 which is adapted to be pushed in the direction shown by the associated arrow for effecting opening and closing movement of the shutter blades. Iris rings 6 and 7 are mounted rotatably about the light axis, and between these iris rings is loosely held an iris blade 8 having pins 8a and 8b fixed respectively to both faces of the iris blade 8. The pin 8a enters freely into a slot 6a formed in the iris ring 6, while the pin 8b enters freely into a slot formed in the other iris ring 7. A tab 7a is provided on the outer periphery of ring 7 and extends rearwardly parallel with the light axis, the rear end of tab 7a being held by the outer periphery of an opening and closing ring 9 rotatably mounted behind the iris ring 7. The ring 9 is biased in the clockwise direction in FIG. 1 by a spring 10 having one end fixed to a stationary pin or stop 11. The opening and closing ring 9 is provided with radial extensions 9a and 9b which have fixed axial pins 12 and 13, respectively, extending in opposite directions. One pin 12 has its end held loosely by a slide plate 22 having a toothed rack as will be hereinafter described, while the other pin 13 extending forwardly has its end lying in such a position that it can depress the release lever 5 of shutter 1.

The opening and closing ring 9 is provided with an additional pin 14 which is fixed and extends rearwardly. A set ring 15 is mounted rotatably about the light axis and rearwardly of the ring 9. A connecting and disconnecting lever 16 is pivotally secured to the front face of set ring 15 at an appropriate position, and tends to rotate in the clockwise direction in FIG. 1. The lever 16 has one arm with its end bent inwardly to form a hook portion 16a for releasably engaging pin 14, and the other arm 16b extends outwardly to form a tail link with its lower side lightly abutted by the upper side of swing link 3. From the periphery of set ring 15, a tab 15a extends forwardly parallel with the light axis, with one side edge adapted to push the tab 2a sidewise, the tabs 15a and 2a lying in one and the same plane of revolution.

The housing, not shown, encloses therein the reflecting mirror, light-intercepting plate, and other elements, and in the rear upper portion thereof, a reflecting mirror 19 and a light-intercepting plate 20 are provided with their upper side edges pivotally supported by a common lateral pin 18. A focussing screen 21 is mounted in fixed relation above the reflecting mirror 19. The aforementioned slide plate 22 with its toothed rack is mounted on the side wall of the camera box, not shown, by means of slot 22a and is slidable up and down. The slide plate 22 is provided with a forked lateral extension 22b which loosely holds the aforementioned pin 12. The rack of slide plate 22 engages a spur wheel 23 mounted rotatably on the side wall of the camera housing, not shown, and to the spur wheel 23 is fixed one end of a sectional plate 24 which serves for turning the reflecting mirror and light-intercepting plate. The free end of sectional plate 24 is provided with two arcuate edges 24a and 24b having different radii from its shaft of rotation 25. When the sectional plate 24 rotates in a clockwise direction in FIG. 1 about shaft 25, its side edge 24c and the edge 24d connecting arcuate edges 24a and 24b together respectively push pins 19a and 20a upwardly to rotate the reflecting mirror and light-intercepting plate respectively about their axis, the pin 19a being fixed to the side edge of reflecting mirror 19, and the pin 20a being fixed to the side edge of light-intercepting plate 20.

To the bottom of the camera, a drive plate 26 is mounted through a slot 26a, the plate 26 being slidable longitudinally of the camera. The drive plate 26 is biased in the direction of the associated arrow by means of a spring 27 which is stronger than the aforementioned spring 10 in tensional force, and a suitable stopper 28 defines the stop position of drive plate 26. The left-hand end of plate 26 is provided with a riser 26b which cooperates with the two pins 29a depending from a rotating disc 29 connected to a film-taking-up reel (not shown). A forked riser 26c is also provided on the side edge of drive plate 26 for loosely holding the pin 15b fixed to set ring 15.

The operation of the device shown in FIG. 1 will now be described. FIG. 1 shows the various parts in readiness for photographing in which the film has been wound up. In this position, the drive plate 26 has been displaced to the left end position as seen in FIG. 1, against the force of spring 27, and is ready to return to its original position upon depression of the release button, not shown, of the shutter. When the release button is depressed by the operator's finger, the release element 30 in engagement with a projection 9c of ring 9 is actuated to have its end 30a shifted in the direction of arrow, and the release element 30 is disengaged from the projection 9c. By virtue of the engagement of pin 14 with the hook portion 16a of lever 16 on set ring 15, the ring 9 will rotate in unison with set ring 15 under the action of spring 27 when the ring 15 rotates in the counterclockwise direction in FIG. 1. Consequently, upon the above-mentioned release of ring 9, the set wheel 15 and the opening and closing ring 9 are rotated promptly in the counterclockwise direction by the returning force of spring 27 through pin 15b, and the ring 9 is rotated against spring 10 which stores corresponding energy.

In the early portion of the rotation of ring 9, a projection 19d of ring 9 acts on the opening and closing element, not shown, of the shutter blades to close the shutter blades which have been in their open position. Along with the rotation of ring 9, iris ring 7 is rotated in unison therewith in the same direction, and iris blade 8 is moved to the iris opening predetermined by the other iris ring 6. At the same time, the ring 9 acts through pin 12 to push down the slide plate 22. Along with the downward movement of slide plate 22, spur wheel 23 in engagement therewith is rotated in the direction of the associated arrow, and the reflecting plate 19 is moved up thereby through plate 24 and pin 19a. Subsequently, the light-intercepting plate 20 is also moved up through pin 20a, FIG. 6 showing the parts in such moved up positions, in which the reflecting mirror and light-intercepting plate are held by engagement of respective edges 24a and 24b of sectional plate with respective pins 19a and 20a.

Figure 3:
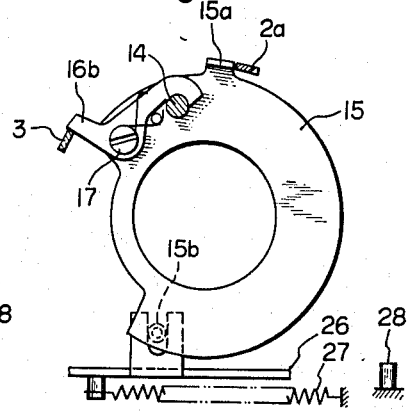
Figure 4:
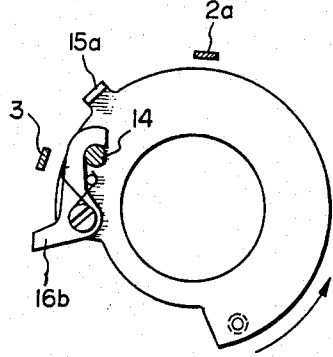

In the course of counterclockwise rotation of set ring 15 by the force of spring 27, the lever arm 16b on the wheel 15 acts on swing link 3 to rotate the latter about pivot 4 and become positioned below the end of swing link 3, as will be understood from FIGS. 3 and 4.

Figure 5:
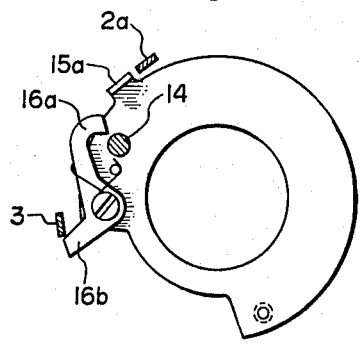

Upon completion of the above-described operations of the iris mechanism and the reflecting mirror as well as the light-intercepting plate, the pin 13 on opening and closing ring 9 presses down the release link 5 of the shutter in the direction of the associated arrow to effect opening and closing of the shutter blades to expose the film to light. Upon completion of the shutter blade movement, the charge ring 2 returns in the direction of the associated arrow, and the swing link 3 thereon presses lever arm 16b down as shown in FIG. 5 to rotate the lever 16 about its pivot 17 in the counterclockwise direction as shown in FIG. 5. Consequently, the pin 14 on ring 9 is released from the lever hook 16a, and the ring 9 together with iris ring 7 are returned to their original positions by the force of spring 10, resulting in full opening of the iris opening. Just before the ring 9 reaches its original position, the projection 19d on ring 9 acts to open the shutter blades, and at the same time, the slide plate 22 is moved upwardly by ring 9 through pin 12 to allow the reflecting mirror and light-intercepting plate to return to their original positions.

Figure 2:
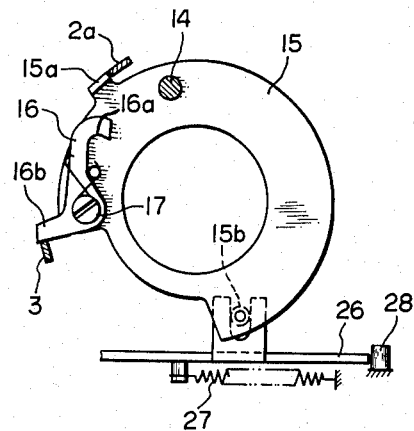
FIGS. 2 through 5 are front views of the set ring at various positions, respectively.

In FIG. 2 is shown the relation between connecting and disconnecting lever 16 and pin 14 when the photographing operation has been completed. When the set ring 15 is rotated clockwise in FIG. 2 along with winding up of the film, the lever hook portion 16a rides over the pin 14 and engages the latter as shown in FIG. 3. When the set ring 15 is rotated as above-described, the lever arm 16b is pressed by the swing link 3 then lying above the arm 16b as shown in FIG. 4, so that the lever 16 is rotated counterclockwise as shown in FIG. 5 to ride over the pin 14, and then the parts resume the positions as shown in FIG. 3. At the same time, the projection 15a on ring 15 drives the tab 2a of charge ring 2 to rotate the latter for charging the shutter.

The drive plate 26 interconnected with the winding-up mechanism of the film is moved by rotation of disc 29 in the direction of the associated arrow, through pin 29a on disc 29 and engaging the riser 26b on drive plate 26.

As hereinbefore described, and according to the present invention, a connecting and disconnecting lever is provided in cooperation with a wheel rotatable about the light axis, whereby all the associated mechanisms, such as the iris mechanisms, the swing mechanisms for the reflecting mirrors and light-intercepting plates, etc., can easily be constructed and assembled, and their operation can be positive. In addition, the device can be compact, and the camera can maintain a characteristic.

What is claimed is:

1. A single-lens reflex camera with a lens shutter and having a light axis, said camera comprising: a set ring rotatable about the light axis of said camera, a connecting and disconnecting lever pivotally connected to said set ring for pivotal movement about an axis parallel to said light axis, said lever having one arm with a hook-shaped end and a second arm forming a tail link, a rotatable opening and closing ring constituting part of an iris mechanism for said camera, a pin on the latter said ring releasably engaged with the hook-shaped end of said lever, shutter-charging means for activating a shutter of the camera, and a swing link having one end pivotally connected to said shutter-charging means and a free end which is engageable with the tail link of said lever, said set ring and opening and closing ring being adjacent one another and rotatable about said light axis as a common axis such that with said set ring rotated in a direction in which the iris mechanism is activated, the hook-shaped end of said lever drives said pin to rotate said opening and closing ring simultaneously, said tail link being engaged by said swing link on said shutter-charging means which is returning to its original position, when the shutter is released just before completion of rotation of said opening and closing ring to disengage the hook-shaped end of said lever and said pin of said opening and closing ring to allow the latter ring to return to its original position, the movement of said opening and closing ring being transmitted to a reflecting miror and light-intercepting plate of said camera.

2. A camera as claimed in claim 1 comprising a spring acting on said opening and closing ring for urging the same to its original position, and spring means acting on said set ring for urging the same away from its original position, the latter spring means having a strength greater than said spring for urging the set ring and the opening and closing ring therewith from their original positions while energizing said spring.

3. A camera as claimed in claim 1 comprising means coupled to said opening and closing ring to operate the mirror and plate comprising a slide plate driven by said opening and closing ring, said slide plate including a toothed rack portion, a spur wheel in engagement with said rack portion for being driven thereby and a sectional plate driven by the spur wheel and engaging the mirror and light-intercepting plate for raising and lowering the same respectively in accordance with the direction of rotation of the spur wheel.

4. A camera as claimed in claim 3 wherein said opening and closing ring is driven by said set ring in a first direction via the pin and hook-shaped end of said lever, said opening and closing ring rotating in an opposite direction when returning to its original position after disengagement of said hook-shaped end of the lever and said pin on the opening and closing ring.

5. In a single-lens reflex camera having a shutter: shutter control means for operating the shutter, an iris mechanism having an open position and an operative position, a first rotatable ring coupled to the iris mechanism for operating the same, a second rotatable ring adjacent the first ring for operating therewith and means interconnecting the first and second rings and the shutter control means to rotatably drive said first and second rings together to activate the iris mechanism and release the shutter after which said first and second rings are decoupled and the first ring returns to its original position and opens the iris mechanism, said means interconnecting the first and second rings and the shutter control means comprising a lever pivotally connected to the second ring for rotation about an axis, said lever having one arm with a hook-shaped end and a second straight arm, means pivotally on the shutter control means for rotation about an axis perpendicular to the first said axis, and means on said first ring releasably engaged with the hook-shaped end of the lever, the latter said means being engaged with the hook shaped end of the lever as the second lever is initially rotated to thereby rotate the first ring therewith after which the means on the shutter control means engages the straight arm of the lever to pivotally move the latter and disengage said latter means from the hooked shaped end and enable the first ring to return to its original position.

6. In a camera as claimed in claim 5 comprising a reflecting mirror and a light intercepting plate both pivotably about a common axis, and means coupling said first rotatable ring with the mirror and plate to raise the same as said first and second rings are rotatably driven together and to lower the same as said first ring returns to its original position.

7. In a camera as claimed in claim 5 comprising first spring means for acting on the second ring to drive the same in rotation in a first direction and second spring means acting on the first ring in an opposite direction to urge the first ring to its original position, said first spring means having greater strength than the second spring means to energize the latter as the first and second rings are rotatably driven together so that when the rings are decoupled the second spring means is effective to return the first ring to its original position.

References Cited by the Examiner
UNITED STATES PATENTS
3,165,042   1/1965   Higuchi _____ 95—42

JOHN M. HORAN, *Primary Examiner.*